United States Patent
Obiya et al.

(10) Patent No.: US 10,476,535 B2
(45) Date of Patent: *Nov. 12, 2019

(54) HIGH-FREQUENCY FRONT END CIRCUIT AND COMMUNICATION APPARATUS

(71) Applicant: Murata Manufacturing Co., Ltd., Kyoto (JP)

(72) Inventors: Hidenori Obiya, Kyoto (JP); Atsushi Horita, Kyoto (JP); Hirotsugu Mori, Kyoto (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/915,545

(22) Filed: Mar. 8, 2018

(65) Prior Publication Data

US 2018/0198474 A1 Jul. 12, 2018

Related U.S. Application Data

(63) Continuation of application No. PCT/JP2016/075263, filed on Aug. 30, 2016.

(30) Foreign Application Priority Data

Sep. 9, 2015 (JP) .................................. 2015-177146

(51) Int. Cl.
*H04B 1/10* (2006.01)
*H04B 1/04* (2006.01)
(Continued)

(52) U.S. Cl.
CPC ................. *H04B 1/04* (2013.01); *H04B 1/00* (2013.01); *H04B 1/0458* (2013.01); *H04B 1/16* (2013.01);
(Continued)

(58) Field of Classification Search
CPC ... H04B 1/04; H04B 1/00; H04B 1/16; H04B 1/18; H04B 1/38; H04B 1/0458; H04W 16/14; H04H 40/18; H03H 9/542
(Continued)

(56) References Cited

U.S. PATENT DOCUMENTS

2006/0270367 A1  11/2006  Burgener et al.
2008/0152049 A1*  6/2008  Sandner ................. H04H 40/18
                                              375/344
(Continued)

FOREIGN PATENT DOCUMENTS

CN     103166654 A    6/2013
JP     2006-217127 A  8/2006
(Continued)

OTHER PUBLICATIONS

U.S. Appl. No. 15/914,493, filed Mar. 7, 2018.*
(Continued)

*Primary Examiner* — Phuong Phu
(74) *Attorney, Agent, or Firm* — Pearne & Gordon LLP

(57) ABSTRACT

A high-frequency front end circuit includes a frequency fixed filter and frequency variable LC filters, and these are connected in series in a signal transmission path. The frequency fixed filter transmits high-frequency signals in a frequency band of a communication band and attenuates high-frequency signals outside the frequency band of the communication band. One of the frequency variable LC filters is an LC filter and attenuates unnecessary wave frequencies in the frequency band of the communication band. Another one of the frequency variable filters is a resonator filter that passes high-frequency signals in a frequency band of a selected channel and attenuates high-frequency signals in frequency bands of adjacent communication channels of the selected channel.

17 Claims, 10 Drawing Sheets

(51) Int. Cl.
  *H04B 1/00* (2006.01)
  *H04B 1/16* (2006.01)
  *H04B 1/18* (2006.01)
  *H04B 1/38* (2015.01)
  *H04W 16/14* (2009.01)

(52) U.S. Cl.
  CPC ............. *H04B 1/18* (2013.01); *H04B 1/38* (2013.01); *H04W 16/14* (2013.01)

(58) Field of Classification Search
  USPC ................. 375/350, 346, 219, 220, 222
  See application file for complete search history.

(56) References Cited

U.S. PATENT DOCUMENTS

| | | | |
|---|---|---|---|
| 2010/0124290 A1* | 5/2010 | Kablotsky | H04L 27/36 375/259 |
| 2011/0115565 A1 | 5/2011 | Cabanillas | |
| 2013/0156074 A1 | 6/2013 | Wang et al. | |
| 2014/0285286 A1 | 9/2014 | Bojer | |
| 2016/0065165 A1 | 3/2016 | Kadota | |
| 2016/0301383 A1* | 10/2016 | Tani | H03H 9/542 |
| 2016/0344092 A1 | 11/2016 | Ogami | |
| 2017/0302243 A1 | 10/2017 | Horita | |

FOREIGN PATENT DOCUMENTS

| | | |
|---|---|---|
| JP | 2008-504745 A | 2/2008 |
| JP | 2010-130328 A | 6/2010 |
| JP | 2013-511220 A | 3/2013 |
| JP | 2013-090165 A | 5/2013 |
| WO | 2014/192754 A1 | 12/2014 |
| WO | 2015/119179 A1 | 8/2015 |
| WO | 2016/076093 A1 | 5/2016 |

OTHER PUBLICATIONS

International Search Report for International Application No. PCT/JP2016/075263, dated Nov. 15, 2016.

Written Opinion for International Application No. PCT/JP2016/075263, dated Nov. 15, 2016.

* cited by examiner

HIGH-FREQUENCY FRONT END CIRCUIT AND COMMUNICATION APPARATUS

This is a continuation of International Application No. PCT/JP2016/075263 filed on Aug. 30, 2106 which claims priority from Japanese Patent Application No. 2015-177146 filed on Sep. 9, 2015. The contents of these applications are incorporated herein by reference in their entireties.

BACKGROUND

Technical Field

The present disclosure relates to a high-frequency front end circuit for making wireless communication.

Currently, various techniques for effectively utilizing a frequency band that is utilized for wireless communication have been devised. For example, Patent Document 1 discloses a system for making wireless communication utilizing a TV white space.

The wireless communication utilizing the TV white space is a technique in which a frequency band used for television broadcasting is opened and the frequency band is utilized for the wireless communication. In the wireless communication utilizing the TV white space, a vacant channel (vacant communication channel) that is not used in the television broadcasting is utilized for the wireless communication. A wireless communication device makes wireless communication using the vacant communication channel in a communication band of the television broadcasting, which has been assigned by a database.

Patent Document 1: Japanese Unexamined Patent Application Publication No. 2013-90165

BRIEF SUMMARY

However, in a wireless communication system utilizing the TV white space, channels that are used in the television broadcasting vary depending on regions. Therefore, the vacant channels and the usage channels vary. In addition, band widths of frequency bands of respective communication channels for the television broadcasting are 6 MHz or 8 MHz and band widths between the communication channels are approximately 0.5 to 1 MHz. That is, the band widths of the frequency bands of the respective communication channels and the band widths between the communication channels are narrow.

For this reason, there is a problem of occurrence of adverse effects by noise depending on filter configurations when the system in which the vacant channels and the usage channels vary and the frequency bands of the respective communication channels and the band widths between the respective communication channels are narrow like the above-described TV white space, for example, is used.

Accordingly, the present disclosure provides a high-frequency front end circuit capable of utilizing a vacant communication channel of a plurality of communication channels in a specific frequency band that is used in a system in which vacant channels and usage channels vary and frequency bands of the respective communication channels and band widths between the respective communication channels are narrow like the above-described wireless communication system utilizing the TV white space, for example, in a state of attenuating noise by devising a filter configuration.

An aspect of the disclosure relates to a high-frequency front end circuit that makes wireless communication by selecting a usage channel from vacant communication channels of a plurality of communication channels in a communication band configured by the plurality of communication channels in a specific frequency band that is used in a system, and has the following features. The high-frequency front end circuit includes a fixed filter and a variable filter. The fixed filter attenuates a high-frequency signal outside the specific frequency band that is used in the system. The variable filter attenuates a high-frequency signal of an unnecessary wave in the specific frequency band, which varies depending on the usage channel.

With this configuration, the fixed filter attenuates an unnecessary wave outside the specific frequency band whereas the variable filter attenuates an unnecessary wave in the specific frequency band. Therefore, a high-frequency signal of the usage channel in the specific frequency band is made to pass therethrough without necessarily being attenuated whereas the other high-frequency signals (unnecessary wave signals) are effectively attenuated.

Furthermore, the high-frequency front end circuit in the aspect of the disclosure can have the following configuration. The system is a wireless communication system utilizing a TV white space. The specific frequency band is a frequency band that is used in television broadcasting. The communication channels are channels that are used in the television broadcasting.

This configuration indicates a mode in which the frequency bands of the communication channels are narrow and frequency intervals between adjacent communication channels are narrow, and the unnecessary wave signals are attenuated more effectively in this mode.

Furthermore, in the high-frequency front end circuit in the aspect of the disclosure, the variable filter can transmit a high-frequency signal in a frequency band of the usage channel and attenuate high-frequency signals in frequency bands of proximity communication channels within three communication channels of the usage channel.

With this configuration, unnecessary wave signals in the frequency bands in proximity to the usage channel are attenuated effectively.

In the high-frequency front end circuit in the aspect of the disclosure, the fixed filter can be a frequency fixed-type LC filter and the variable filter can be a frequency variable-type elastic wave resonator filter.

With this configuration, the LC filter is used for the fixed filter that needs a wide band pass and an attenuation band whereas the elastic wave resonator filter is used for the variable filter that needs a narrow pass band and steep attenuation characteristics. Therefore, the respective filter characteristics function effectively, so that desirable filter characteristics can be comprehensively achieved reliably and accurately.

Furthermore, the high-frequency front end circuit in the aspect of the disclosure can have the following configuration. The high-frequency front end circuit includes a transmission-side circuit, a reception-side circuit, an antenna-side circuit, and a diplexer. The transmission-side circuit transmits a transmission signal using the usage channel. The reception-side circuit transmits a reception signal using the usage channel. The antenna-side circuit transmits the transmission signal and the reception signal. The diplexer connects the transmission-side circuit and the reception-side circuit with the antenna-side circuit. The fixed filter is included in the antenna-side circuit. The variable filter is included in the transmission-side circuit or the transmission-side circuit and the reception-side circuit.

With this configuration, in the circuit in which signals are transmitted and received with a common antenna, the high-frequency signals of the usage channel can be made to pass therethrough with low loss and the high-frequency signals in the frequency bands of the channels other than the usage channel in the communication band and the frequency bands outside the communication band can be effectively attenuated.

Furthermore, the high-frequency front end circuit in the aspect of the disclosure can further include a second variable filter formed by a frequency variable-type LC filter and attenuating a frequency in the specific frequency band, which generates IMD (intermodulation distortion).

With this configuration, the unnecessary wave in the communication band can be attenuated more effectively in accordance with the usage channel.

Moreover, in the high-frequency front end circuit in the aspect of the disclosure, the second variable filter can be included between the fixed filter and the diplexer or between the diplexer and the variable filter.

With this configuration, increase in size of the circuit configuration of the high-frequency front end circuit can be suppressed as much as possible while providing the function of the second variable filter.

Furthermore, the high-frequency front end circuit in the aspect of the disclosure may have the following configuration. A communication signal that is transmitted and received with the antenna contains variable filter information containing information related to the high-frequency signal of the unnecessary wave in the specific frequency band. The variable filter attenuates the high-frequency signal of the unnecessary wave in the specific frequency band based on the variable filter information.

With this configuration, information for setting the variable filter may be acquired with another communication system, so that increase in size of the configuration of the high-frequency front end circuit can be suppressed.

Furthermore, the high-frequency front end circuit in the aspect of the disclosure can have the following configuration. The high-frequency front end circuit includes a detector and a determination unit. The detector detects respective reception levels of a plurality of vacant communication channels when there is the plurality of vacant communication channels. The determination unit selects, as the usage channel, the vacant communication channel having the highest reception level among the plurality of detected reception levels.

With this configuration, more reliable wireless communication can be performed.

Furthermore, the high-frequency front end circuit in the aspect of the disclosure may have the following configuration. The transmission-side circuit includes an amplification circuit amplifying the transmission signal. The amplification circuit can include a first amplification element amplifying the transmission signal and a second amplification element amplifying a signal amplified by the first amplification element.

With this configuration, the amplification circuit is configured by the amplification elements at two stages. Therefore, a high-output transmission signal with suppressed distortion is output.

In the high-frequency front end circuit in the aspect of the disclosure, the amplification circuit can further include an interstage filter connected between the first amplification element and the second amplification element and attenuating a harmonic distortion signal of the transmission signal.

With this configuration, distortion of the transmission signal is further suppressed.

Furthermore, the high-frequency front end circuit in the aspect of the disclosure can have the following configuration. The second amplification element is provided in a plurality. The plurality of second amplification elements is included for respective different frequency bands. The amplification circuit further includes an interstage switch selecting at least one of the plurality of second amplification elements included for the respective frequency bands in accordance with the usage channel and connecting the selected second amplification element to the first amplification element.

With this configuration, the amplification element in accordance with the usage channel is selected, thereby amplifying the transmission signal more efficiently.

Furthermore, the high-frequency front end circuit in the aspect of the disclosure can have the following configuration. The variable filter includes an input terminal, an output terminal, a series arm resonance circuit, and first and second parallel arm resonance circuits. The series arm resonance circuit is connected in series between the input terminal and the output terminal. The first parallel arm resonance circuit is a circuit both ends of which are one end of the series arm resonance circuit and a ground potential. The second parallel arm resonance circuit is a circuit both ends of which are the other end of the series arm resonance circuit and the ground potential.

The series arm resonance circuit includes a fixed capacitor having a fixed capacitance. Each of the series arm resonance circuit and the first and second parallel arm resonance circuits includes a variable capacitor, an inductor, and an elastic wave resonator. The variable capacitor, the inductor, and the elastic wave resonator in the series arm resonance circuit are connected in parallel. The variable capacitor, the inductor, and the elastic wave resonator in each of the first and second parallel arm resonance circuits are connected in series. The fixed capacitor in the series arm resonance circuit is connected to the parallel arm resonator side including the elastic wave resonator having a lower impedance of an impedance of the elastic wave resonator of the first parallel arm resonance circuit and an impedance of the elastic wave resonator of the second parallel arm resonance circuit.

With this configuration, the filter characteristics of the variable filter, in particular, attenuation characteristics thereof can be improved.

Furthermore, the high-frequency front end circuit in the aspect of the disclosure can have the following configuration. The second variable filter includes an input terminal, an output terminal, a first series arm LC filter circuit, and first and second parallel arm LC filter circuits. The first series arm LC filter circuit is connected between the input terminal and the output terminal. The first parallel arm LC filter circuit is a circuit both ends of which are one end of the first series arm LC filter circuit and a ground potential. The second parallel arm LC filter circuit is a circuit both ends of which are the other end of the first series arm LC filter circuit and the ground potential. Each of the first and second parallel arm LC filter circuits includes a variable capacitor and an inductor connected in series. The first series arm LC filter circuit includes a fixed capacitor, an LC series circuit, and an LC parallel circuit. The fixed capacitor is connected in parallel to the LC series circuit. Both ends of the LC series circuit is the input terminal and the output terminal and the LC series circuit includes a fixed capacitor and an inductor connected in series. The LC parallel circuit includes a variable capacitor and an inductor connected in parallel. The inductor included in the LC series circuit is directly connected to the output terminal or is connected to the output terminal with another inductor interposed therebetween.

With this configuration, the filter characteristics of the second variable filter, in particular, attenuation characteristics thereof can be improved.

Moreover, another aspect of the disclosure relates to a communication apparatus. The communication apparatus includes the high-frequency front end circuit according to any one of the above-described aspects and executes audio communication or data communication using a communication signal that is transferred in wireless communication with the high-frequency front end circuit.

With this configuration, high-quality communication (for example, with high data transfer speed or with high audio quality) can be achieved.

The aspect of the present disclosure makes it possible to reliably perform wireless communication using a selected communication channel when the wireless communication is performed using the selected communication channel in a communication band configured by a plurality of communication channels.

DETAILED DESCRIPTION

Figure 1:
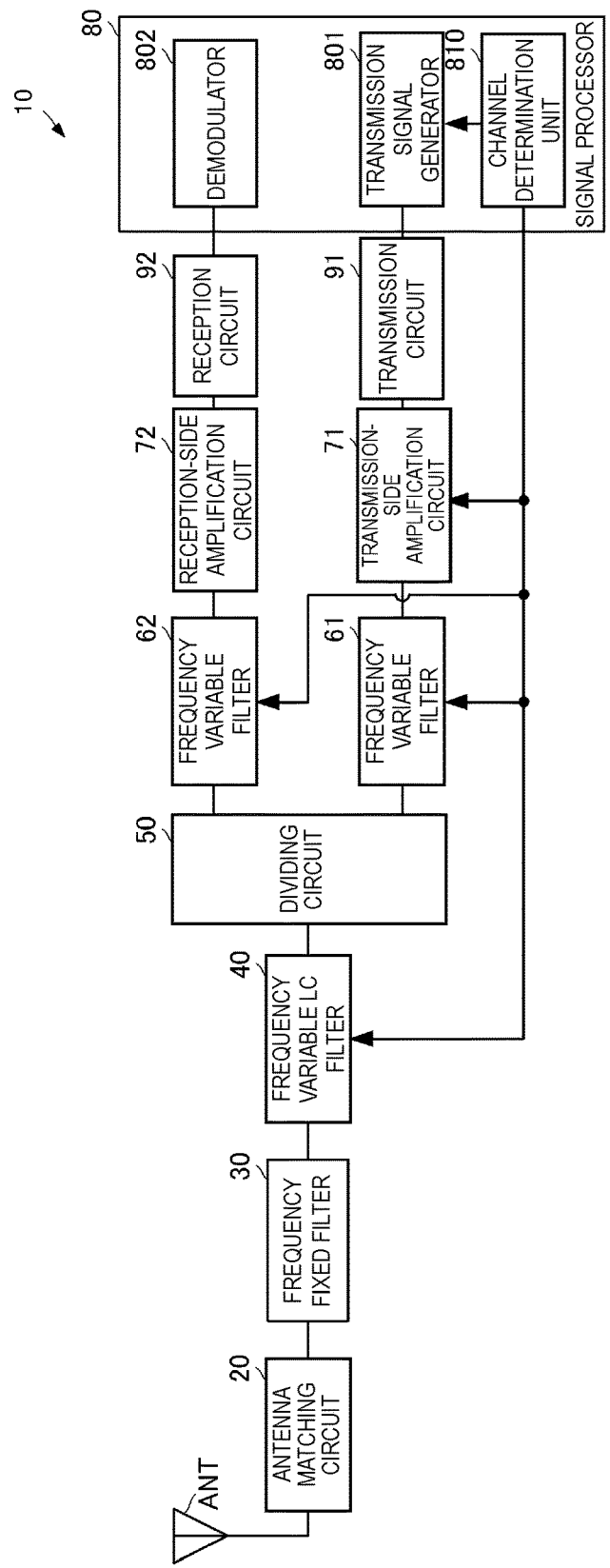
FIG. 1 is a functional block diagram of a high-frequency front end circuit according to a first embodiment of the present disclosure.

A high-frequency front end circuit according to a first embodiment of the present disclosure will be described with reference to the drawings. FIG. 1 is a functional block diagram of the high-frequency front end circuit in the first embodiment of the present disclosure.

A high-frequency front end circuit 10 includes an antenna ANT, an antenna matching circuit 20, a frequency fixed filter 30, a frequency variable LC filter 40, a diplexer 50, frequency variable filters 61 and 62, a transmission-side amplification circuit 71, a reception-side amplification circuit 72, a signal processor 80, a transmission circuit 91, and a reception circuit 92. The signal processor 80 includes a transmission signal generator 801, a demodulator 802, and a channel determination unit 810. The frequency fixed filter 30 corresponds to a "fixed filter" in the present disclosure. The frequency variable LC filter 40 corresponds to a "second variable filter" in the present disclosure. The frequency variable filters 61 and 62 correspond to a "variable filter" in the present disclosure. It is sufficient that the high-frequency front end circuit 10 includes at least the frequency fixed filter 30 and the frequency variable filter 61. Some or all components of the diplexer 50, the frequency variable filter 62, the transmission-side amplification circuit 71, the reception-side amplification circuit 72, and the signal processor 80 can be omitted.

The antenna ANT is connected to the antenna matching circuit 20. The antenna matching circuit 20 is connected to the frequency fixed filter 30. The antenna matching circuit 20 may be a fixed matching circuit or a variable matching circuit. The frequency fixed filter 30 is connected to the frequency variable LC filter 40. The frequency variable LC filter 40 is connected to an antenna-side terminal of the diplexer 50. A transmission-side terminal of the diplexer 50 is connected to the frequency variable filter 61. The frequency variable filter 61 is connected to the transmission-side amplification circuit 71. The transmission-side amplification circuit 71 is connected to the transmission circuit 91. The transmission circuit 91 is connected to the transmission signal generator 801 of the signal processor 80. The reception-side terminal of the diplexer 50 is connected to the frequency variable filter 62. The frequency variable filter 62 is connected to the reception-side amplification circuit 72. The reception-side amplification circuit 72 is connected to the reception circuit 92. The reception circuit 92 is connected to the demodulator 802 of the signal processor 80. A circuit from the diplexer 50 to the antenna ANT side corresponds to an "antenna-side circuit" in the present disclosure, a circuit from the diplexer 50 to the transmission circuit 91 side corresponds to a "transmission-side circuit" in the present disclosure, and a circuit from the diplexer 50 to the reception circuit 92 side corresponds to a "reception-side circuit" in the present disclosure.

The high-frequency front end circuit 10 transmits and receives high-frequency signals utilizing a vacant communication channel in a communication band configured by a plurality of communication channels. For example, the high-frequency front end circuit 10 transmits and receives the high-frequency signals in accordance with specification of a TV white space. With the specification of the TV white space, a channel through which no signal of television broadcasting is transmitted among the plurality of communication channels set to a UHF (ultra high frequency) band of the television broadcasting, that is, a communication band of 470 [MHz] to 790 [MHz] and respectively having a frequency band width of 6 [MHz] is used as the vacant communication channel.

Figure 2:
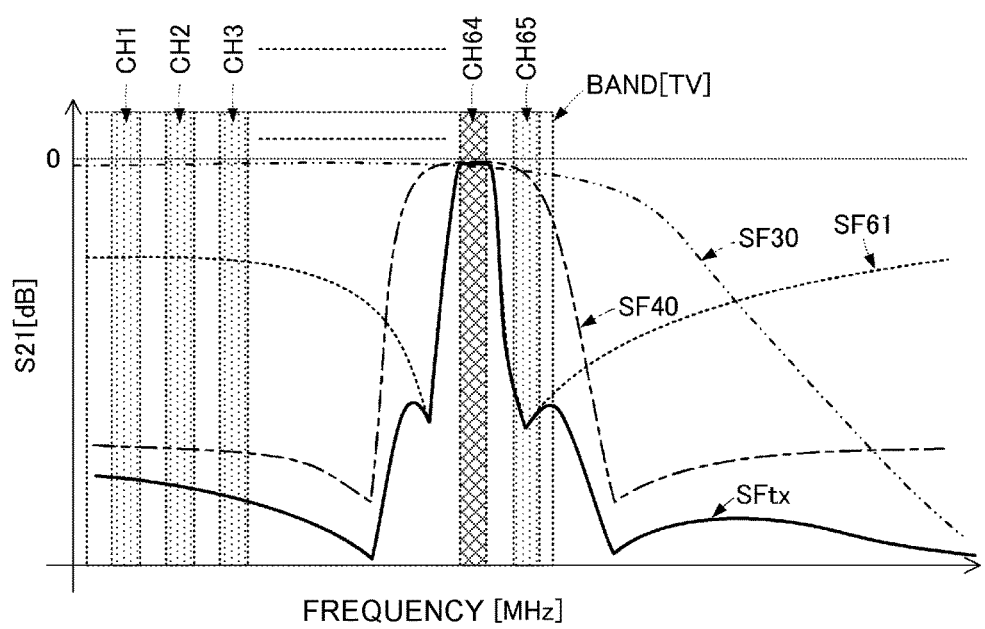
FIG. 2 is a graph illustrating bandpass characteristics of the high-frequency front end circuit in the first embodiment of the present disclosure.

FIG. 2 is a graph illustrating bandpass characteristics of the high-frequency front end circuit in the first embodiment of the present disclosure. FIG. 2 illustrates relations between the communication band and the respective communication channels. It should be noted that FIG. 2 illustrates the case in which a communication channel CH64 is a selected channel (vacant communication channel that is used for communication in the high-frequency front end circuit 10).

The antenna matching circuit 20 performs impedance matching between the antenna ANT and a circuit at the signal processor 80 side from the frequency fixed filter 30. The antenna matching circuit 20 is configured by an inductor and a capacitor. For example, in the antenna matching circuit 20, element values of the inductor and the capacitor are set such that return loss of the antenna ANT is equal to or lower than a predetermined value in the communication band overall.

The frequency fixed filter 30 is configured by an inductor and a capacitor. That is to say, the frequency fixed filter 30 is a frequency fixed-type LC filter. In the frequency fixed filter 30, element values of the inductor and the capacitor are set such that a frequency band of the communication band is within a pass band thereof and a frequency band outside the communication band is within an attenuation band thereof. For example, the frequency fixed filter 30 is configured by a low pass filter. As indicated by filter characteristics SF30 in FIG. 2, the frequency fixed filter 30 is configured such that the frequency band of the communication band is within the pass band thereof and the frequency band which is higher than the frequency band of the communication band is within the attenuation band thereof. The frequency fixed filter 30 therefore transmits high-frequency signals in the communication band with low loss and attenuates high-frequency signals outside the communication band.

The frequency variable LC filter 40 includes at least a variable capacitor, and further includes at least one of an inductor and a capacitor. That is to say, the frequency variable LC filter 40 is a frequency variable-type LC filter. The frequency variable LC filter 40 is a band pass filter. The specific circuit configuration of the frequency variable LC filter 40 will be described later.

The frequency variable LC filter 40 changes the pass band and the attenuation band thereof in accordance with the selected channel. In this case, the pass band thereof contains the frequency band of the selected channel. As indicated by filter characteristics SF40 in FIG. 2, the frequency band width of the pass band of the frequency variable LC filter 40 is larger than the frequency band width of the selected channel. For example, the frequency band width of the pass band of the frequency variable LC filter 40 is approximately 10 times as large as the frequency band width of the selected channel.

The frequency variable LC filter 40 has the attenuation poles at both sides of the pass band on a frequency axis. As indicated by the filter characteristics SF40 in FIG. 2, the attenuation band of the frequency variable LC filter 40 contains no frequency band in which the attenuation is largely decreased and a predetermined attenuation can be provided at all of the frequencies in the communication band outside the pass band.

The frequency variable LC filter 40 therefore transmits high-frequency signals in the frequency band for a plurality of channels including the selected channel with low loss and attenuates high-frequency signals in the other frequency bands. Accordingly, the frequency variable LC filter 40 can attenuate unnecessary waves present at frequencies separated from the frequencies of the selected channel in the communication band. In particular, the frequency variable LC filter 40 can enlarge a frequency range of the attenuation band in comparison with the frequency variable filters 61 and 62 using resonators, which will be described later. Therefore, the frequency variable LC filter 40 is effective for attenuation of IMD that can be generated in a large frequency band in the communication band, which varies in accordance with the usage communication channel (selected channel).

The diplexer 50 is configured by a circulator, a duplexer, or the like. The diplexer 50 outputs a transmission signal (high-frequency signal) input from the transmission-side terminal to the antenna-side terminal and outputs a reception signal (high-frequency signal) input from the antenna-side terminal to the reception-side terminal.

Furthermore, each of the frequency variable LC filters 61 and 62 includes at least a resonator and a variable capacitor, and further includes at least one of an inductor and a capacitor in accordance with filter characteristics. That is to say, the frequency variable filters 61 and 62 are frequency variable-type resonator filters. The frequency variable filters 61 and 62 are band pass filters using resonance points and anti-resonance points of the resonators. The specific circuit configurations of the frequency variable filters 61 and 62 will be described later. The frequency variable filters 61 and 62 have the same basic configuration and the frequency variable filter 61 is therefore described below.

The frequency variable filter 61 changes a pass band and an attenuation band thereof in accordance with the selected channel. In this case, the pass band thereof contains the frequency band of the selected channel. As indicated by filter characteristics SF61 in FIG. 2, the frequency band width of the pass band of the frequency variable filter 61 is substantially the same as the frequency band width of the selected channel.

The frequency variable filter 61 has attenuation poles at both sides of the pass band on the frequency axis. The frequency variable filter 61 is the resonator filter and attenuation characteristics of the pass band thereof are steeper than attenuation characteristics of the LC filter, as indicated by the filter characteristics SF61 in FIG. 2.

The frequency variable filter 61 therefore transmits high-frequency signals of the selected channel with low loss and attenuates high-frequency signals of adjacent communication channels. The frequency variable filter 61 may have specification to not only attenuate the high-frequency signals of the adjacent communication channels but also attenuate high-frequency signals in frequency bands of an adjacent channel of the adjacent channel and an adjacent channel of the adjacent channel of the adjacent channel, that is, the frequency bands for three channels (six channels in total including the channels at the low frequency side and the high frequency side of the frequency region) close to the communication channel. It is sufficient that the width of the frequency band in which the high-frequency signals are attenuated is appropriately set in accordance with system specification in this range.

As indicated by the filter characteristics SF61 in FIG. 2, the attenuation band of the frequency variable filter 61 has frequency bands in which the attenuation is decreased at the opposite sides to the pass band with respect to the attenuation poles. However, the sufficient attenuation can be provided with the frequency variable LC filter 40 and the frequency fixed filter 30 even in the frequency bands in which the attenuation cannot be provided with the frequency variable filter 61 because the frequency variable filter 61, the frequency variable LC filter 40, and the frequency fixed filter 30 are connected in series in a transmission path of the high-frequency signals.

Therefore, the high-frequency signals of the selected channel can be made to pass therethrough with low loss and the high-frequency signals in frequency bands other than the selected channel, which include the adjacent communication channels, can be attenuated as indicated by total filter characteristics SFtx in FIG. 2. The same action effects can be provided even when the selected channel is switched.

The transmission-side amplification circuit 71 includes a so-called amplification element. The specific circuit configuration of the transmission-side amplification circuit 71 will be described later. The transmission-side amplification circuit 71 amplifies a transmission signal in a baseband from the transmission signal generator 801, which has been converted into an RF (radio frequency) signal in the transmission circuit 91, and outputs it to the frequency variable filter 61. The reception-side amplification circuit 72 includes a so-called LNA (low noise amplifier). The reception-side amplification circuit 72 amplifies a reception signal output from the frequency variable filter 62 and outputs it to the demodulator 802 with the reception circuit 92 interposed therebetween (for example, after converting the RF signal into a signal in the baseband in the reception circuit 92).

The channel determination unit 810 of the signal processor 80 detects the vacant communication channels in the communication band. For example, the channel determination unit 810 acquires a map of the vacant channels from the outside and detects the vacant channels based on the map. The channel determination unit 810 selects at least one of the vacant communication channels and sets it as the selected channel. The channel determination unit 810 outputs the selected channel to the transmission signal generator 801. The transmission signal generator 801 generates the transmission signal with a high-frequency signal having a frequency of the selected channel and outputs it to the transmission-side amplification circuit 71. Although not illustrated in the drawing, the channel determination unit 810 outputs the selected channel to the demodulator 802. The demodulator 802 demodulates the reception signal with a local signal based on the selected channel.

The map of the vacant communication channels may be acquired from a circuit outside the high-frequency front end circuit 10 or may be acquired by demodulating a communication signal containing map information, which is received by the antenna ANT. In this case, instead of the map information, variable filter information indicating a frequency of an unnecessary wave contained in the communication band and indicating a necessary attenuation and the like for attenuating the frequency to a desirable value may be acquired. It is sufficient that the channel determination unit 810 sets at least one of the frequency variable LC filter 40 and the frequency variable filters 61 and 62 in accordance with the variable filter information when it acquires the variable filter information.

Furthermore, the signal processor 80 also has the circuit configuration achieving a desired function of audio communication, data communication, or the like using a communication signal that is transferred in the wireless communication with the high-frequency front end circuit 10.

The channel determination unit 810 also outputs the selected channel to the frequency variable LC filter 40, the transmission-side amplification circuit 71, the frequency variable filter 61, and the frequency variable filter 62. The frequency variable LC filter 40, the frequency variable filter 61, and the frequency variable filter 62 achieve the above-described filter characteristics using the selected channel. The transmission-side amplification circuit 71 performs amplification processing on the transmission signal using the selected channel.

As described above, when wireless communication is performed using the selected communication channel (selected channel) in the communication band configured by the plurality of communication channels, usage of the configuration of the high-frequency front end circuit 10 in the embodiment can achieve the wireless communication with low loss using the selected channel. In particular, even in a system in which the vacant channels and the usage channel vary and the frequency bands of the respective communication channels and the band widths between the respective communication channels are narrow, usage of the configuration of the high-frequency front end circuit 10 in the embodiment can achieve wireless communication in each communication channel with low loss.

Figure 3:
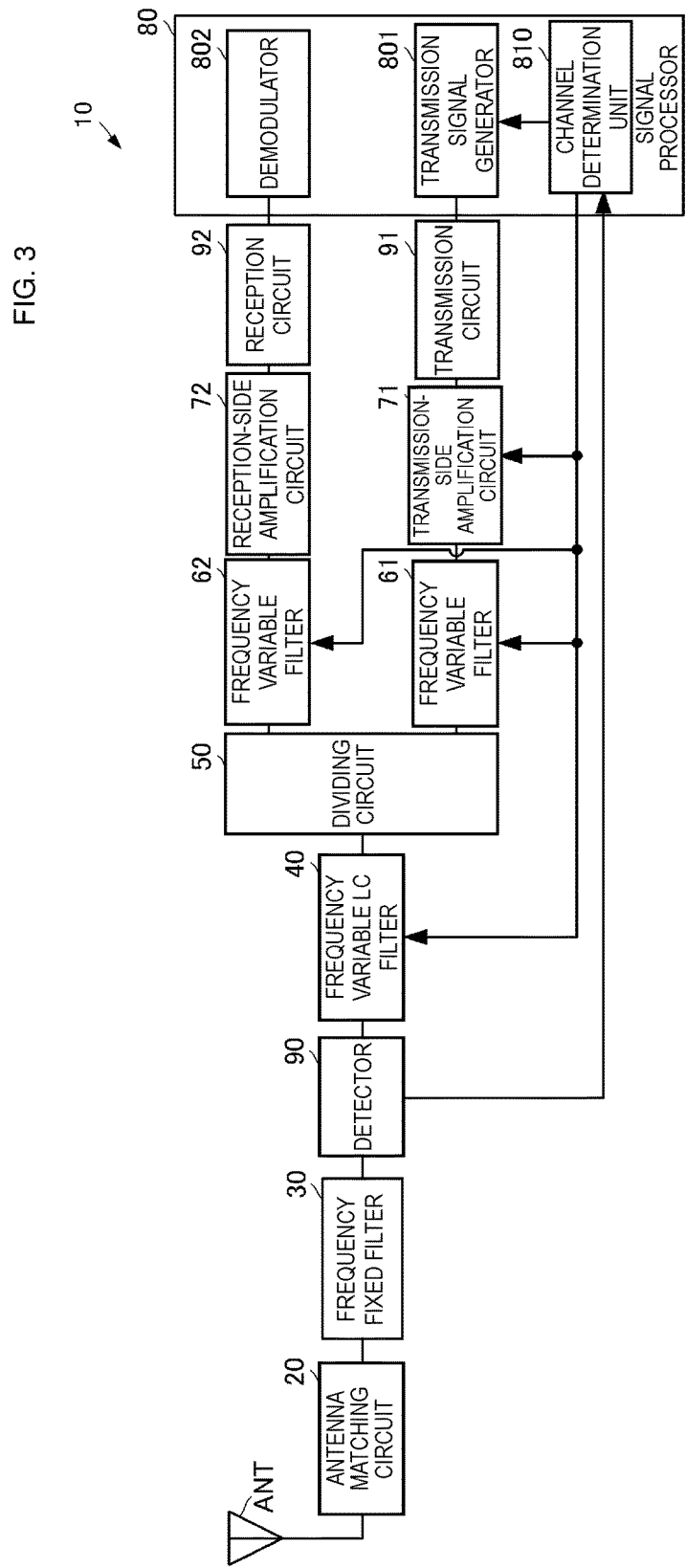
FIG. 3 is a functional block diagram of a high-frequency front end circuit according to a second embodiment of the present disclosure.

Next, a high-frequency front end circuit according to a second embodiment of the present disclosure will be described with reference to the drawing. FIG. 3 is a functional block diagram of the high-frequency front end circuit in the second embodiment of the present disclosure.

A high-frequency front end circuit 10A in the embodiment is configured by adding a detector 90 to the high-frequency front end circuit 10 in the first embodiment. Other configurations thereof are the same as those of the high-frequency front end circuit 10 in the first embodiment.

The detector 90 is connected between the frequency fixed filter 30 and the frequency variable LC filter 40. The detector 90 detects signal levels (amplitude levels) of the respective communication channels and outputs them to the channel determination unit 810.

The channel determination unit 810 determines, as the selected channel, the communication channel having the highest signal level among the plurality of vacant communication channels.

With this configuration, wireless communication utilizing the communication channel having the high reception level can be performed.

The detector 90 may be installed between the antenna ANT and the diplexer 50 as in the embodiment but a totally different circuit exclusive for detection may be provided. The detector 90 may be arranged in the signal processor 80 or may be arranged in the demodulator 802.

Figure 4:
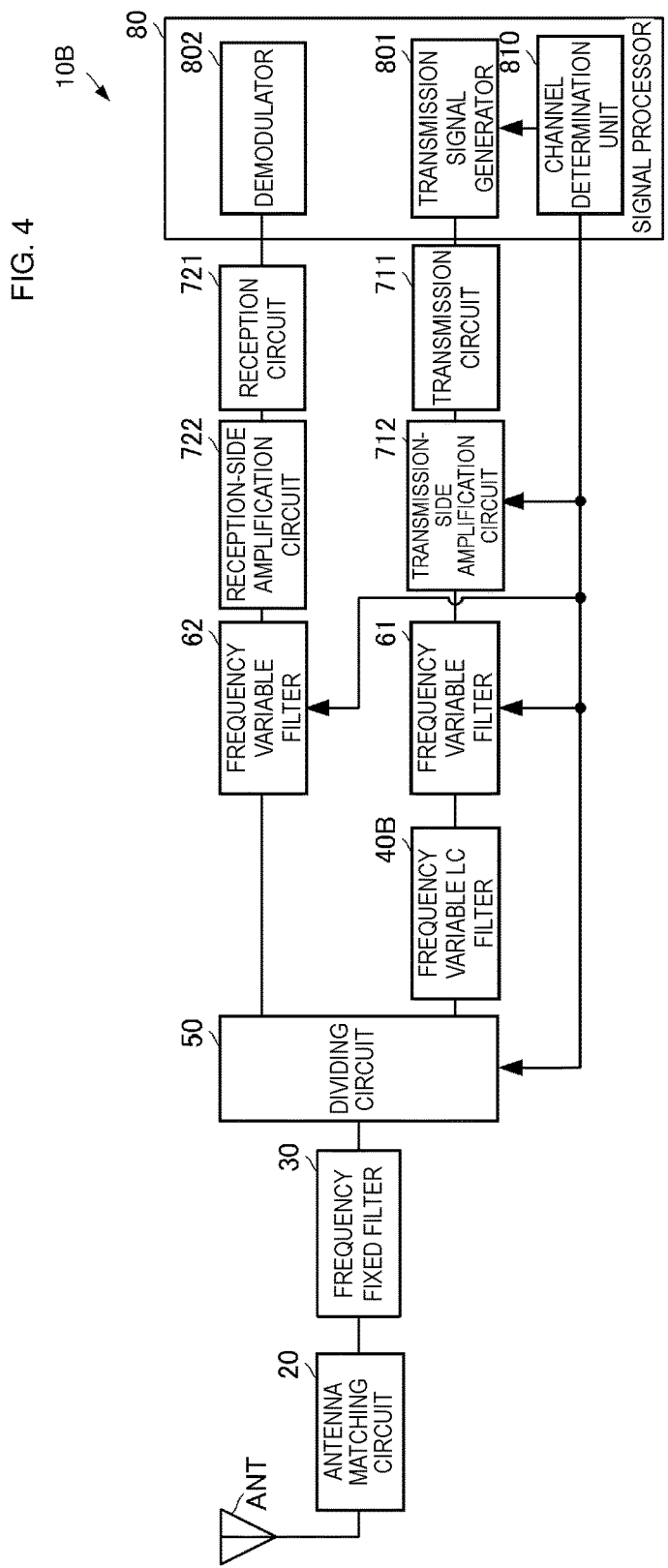
FIG. 4 is a functional block diagram of a high-frequency front end circuit according to a third embodiment of the present disclosure.

Next, a high-frequency front end circuit according to a third embodiment of the present disclosure will be described with reference to the drawing. FIG. 4 is a functional block diagram of the high-frequency front end circuit in the third embodiment of the present disclosure.

A high-frequency front end circuit 10B in the embodiment is different from the high-frequency front end circuit 10 in the first embodiment in a connection position of a frequency variable LC filter 40B. The frequency variable LC filter 40B has the basic configuration as that of the frequency variable LC filter 40 in the first embodiment.

Even with this configuration, the same action effects as those in the first embodiment can be provided for at least a transmission signal.

Figure 5:
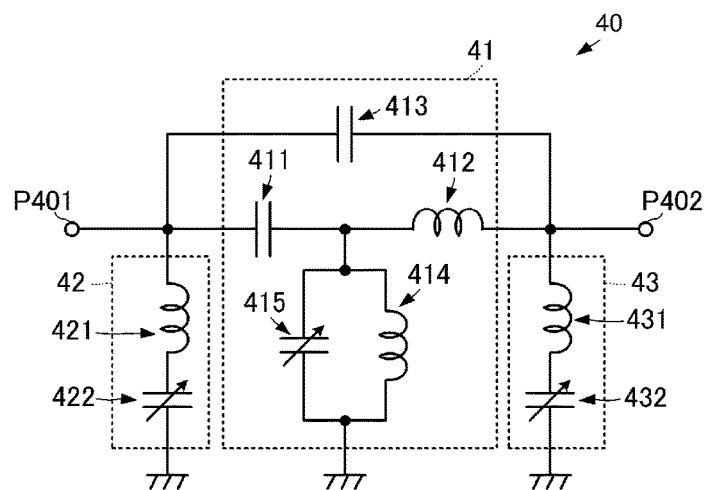
FIG. 5 is a circuit diagram illustrating a first mode of a frequency variable LC filter in the embodiment of the present disclosure.

Next, the specific configuration of the LC filter-type frequency variable filter in the high-frequency front end circuit in each of the embodiments will be described. FIG. 5 is a circuit diagram illustrating a first mode of a frequency variable LC filter in the embodiment of the present disclosure.

The frequency variable LC filter 40 includes a first series arm LC filter circuit 41, a first parallel arm LC filter circuit 42, a second parallel arm LC filter circuit 43, and connection terminals P401 and P402. The connection terminal P401 and the connection terminal P402 correspond to an "input terminal" and an "output terminal" in the present disclosure, respectively.

The first series arm LC filter circuit 41 is connected between the connection terminal P401 and the connection terminal P402. The first parallel arm LC filter circuit 42 is connected between the first series arm LC filter circuit 41 at the connection terminal P401 side and a ground potential. The second parallel arm LC filter circuit 43 is connected between the first series arm LC filter circuit 41 at the connection terminal P402 side and the ground potential.

The first series arm LC filter circuit 41 includes capacitors 411 and 413, inductors 412 and 414, and a variable capacitor 415. The capacitor 411 and the inductor 412 are connected in series between the connection terminals P401 and P402. In this case, the inductor 412 is connected directly to the connection terminal P402. The capacitor 413 is connected in parallel to a series resonance circuit of the capacitor 411 and the inductor 412. The inductor 414 and the variable capacitor 415 are connected in parallel. This parallel resonance circuit is connected between a connection point of the capacitor 411 and the inductor 412 and the ground potential.

The first parallel arm LC filter circuit 42 includes an inductor 421 and a variable capacitor 422. A series resonance circuit of the inductor 421 and the variable capacitor 422 is connected between the first series arm LC filter circuit 41 at the connection terminal P401 side and the ground potential.

The second parallel arm LC filter circuit 43 includes an inductor 431 and a variable capacitor 432. A series resonance circuit of the inductor 431 and the variable capacitor 432 is connected between the first series arm LC filter circuit 41 at the connection terminal P402 side and the ground potential.

Figure 6:
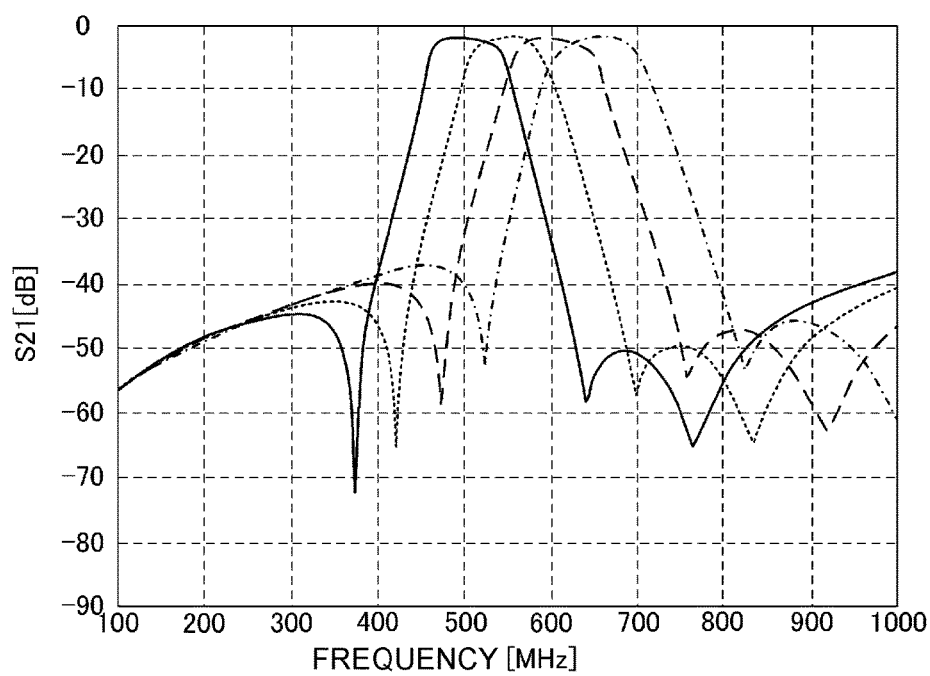
FIG. 6 is a graph illustrating bandpass characteristics of the frequency variable LC filter illustrated in FIG. 5.

This configuration can realize a band pass filter having the pass band which is changed by changing the capacitances of the variable capacitors 415, 422, and 432. FIG. 6 is a graph illustrating bandpass characteristics of the frequency variable filter illustrated in FIG. 5. As illustrated in FIG. 6, usage of the frequency variable LC filter 40 can achieve filter characteristics having the pass band width of approximately 100 [MHz] and having the attenuation poles at both sides of the pass band. In particular, as illustrated in FIG. 5, the inductor 412 of the first series arm LC filter circuit 41 is connected to the connection terminal P402 with no capacitor interposed therebetween, thereby making attenuation characteristics steep.

In other words, the attenuation characteristics can be made steep by connecting the inductor 412 of the first series arm LC filter circuit 41 directly to the connection terminal P402 or connecting it to the connection terminal P402 with another inductor interposed therebetween.

This effect is considered to be provided for the following reason.

The capacitor that is directly connected to the inductor has frequency characteristics of attenuating low frequency components and transmitting high frequency components like a high pass filter, and therefore causes deterioration in the attenuation of the high frequency components.

On the other hand, the inductor that is directly connected to the connection terminal has frequency characteristics of attenuating the high frequency components and transmitting the low frequency components like a low pass filter.

The inductor can be connected to the connection terminal with another inductor interposed therebetween.

Figure 7:
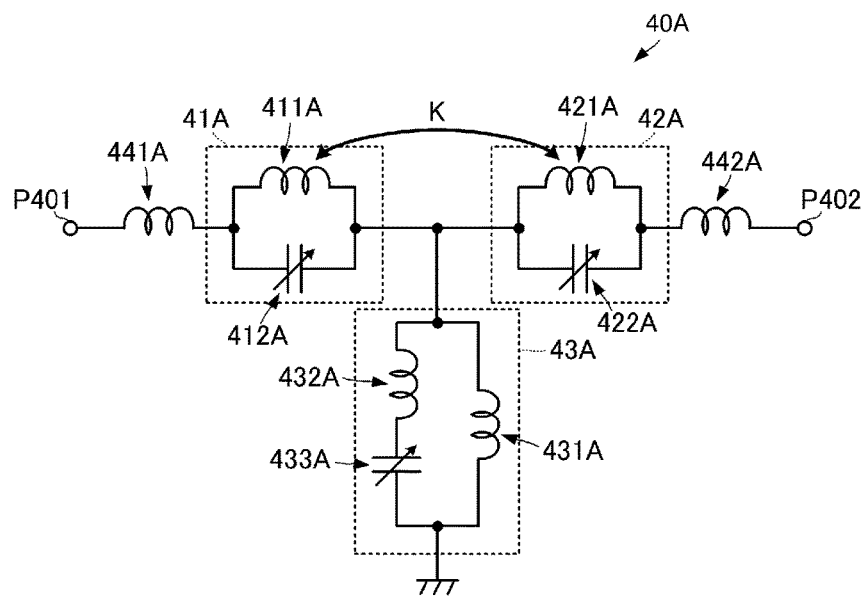
FIG. 7 is a circuit diagram illustrating a second mode of the frequency variable LC filter in the embodiment of the present disclosure.

FIG. 7 is a circuit diagram illustrating a second mode of the LC filter-type frequency variable filter in the embodiment of the present disclosure.

A frequency variable LC filter 40A includes series arm LC filter circuits 41A and 42A, a parallel arm LC filter circuit 43A, and the connection terminals P401 and P402. The series arm LC filter circuits 41A and 42A are connected in series between the connection terminal P401 and the connection terminal P402. One end of the series arm LC filter circuit 41A is connected to the connection terminal P401 with an inductor 441A interposed therebetween and the other end thereof is connected to one end of the series arm LC filter circuit 42A. The other end of the series arm LC filter circuit 42A is connected to the connection terminal P402 with an inductor 442A interposed therebetween. The parallel arm LC filter circuit 43A is connected between a connection point of the series arm LC filter circuits 41A and 42A and the ground potential.

The series arm LC filter circuit 41A is a parallel resonance circuit of an inductor 411A and a variable capacitor 412A. The series arm LC filter circuit 42A is a parallel resonance circuit of an inductor 421A and a variable capacitor 422A. The parallel arm LC filter circuit 43A includes a series circuit of an inductor 432A and a variable capacitor 433A, and an inductor 431A. The inductor 431A is connected in parallel to the series circuit.

The inductor 411A of the series arm LC filter circuit 41A and the inductor 421A of the series arm LC filter circuit 42A are magnetically coupled with each other.

Figure 8:
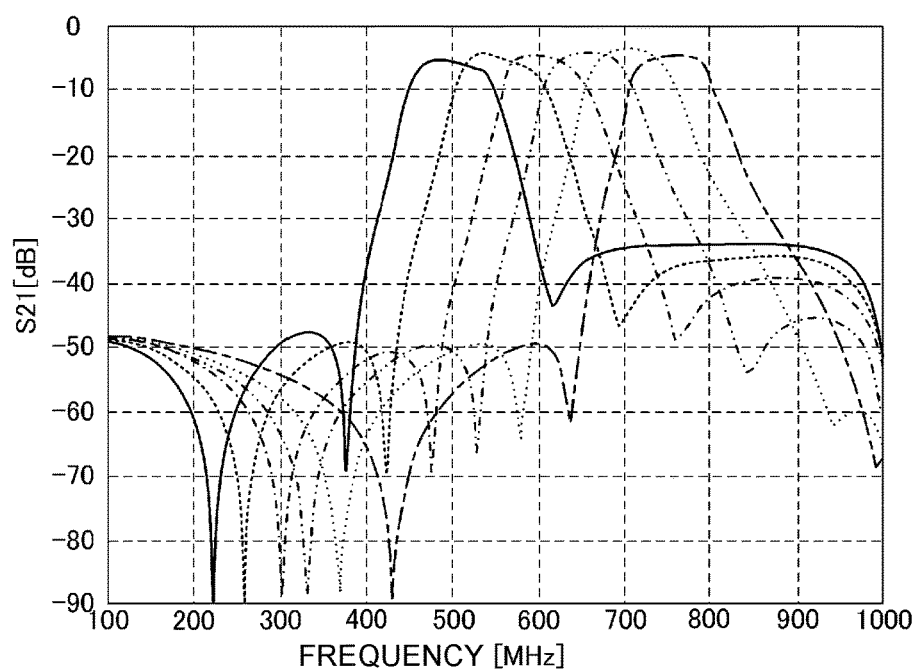
FIG. 8 is a graph illustrating bandpass characteristics of the frequency variable LC filter illustrated in FIG. 7.

This configuration can realize a band pass filter having the pass band which is changed by changing the capacitances of the variable capacitors 412A, 422A, and 433A. FIG. 8 is a graph illustrating bandpass characteristics of the frequency variable filter illustrated in FIG. 7. As illustrated in FIG. 8, usage of the frequency variable LC filter 40A can achieve the filter characteristics having the pass band width of approximately 100 [MHz] and having the attenuation poles at both sides of the pass band. In particular, as illustrated in FIG. 7, the inductor 411A of the series arm LC filter circuit 41A and the inductor 421A of the series arm LC filter circuit 42A are magnetically coupled with each other, so that the attenuation characteristics can be made steep.

Figure 9:
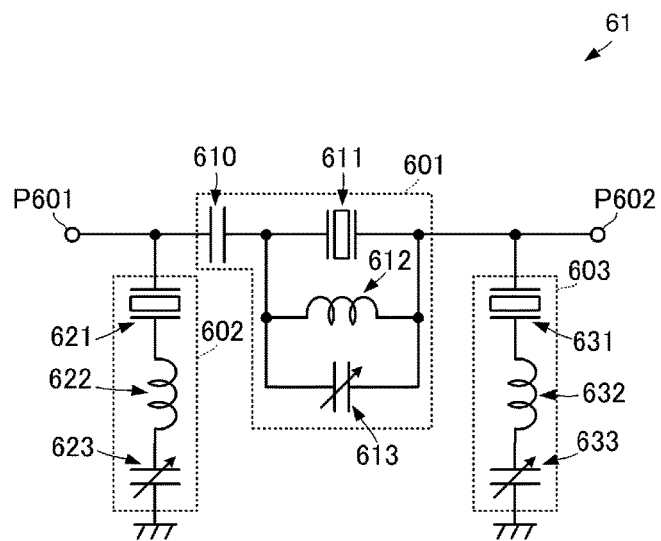
FIG. 9 is a circuit diagram illustrating a first mode of a resonator filter-type frequency variable filter in the embodiment of the present disclosure.

Next, the specific configuration of a resonator filter-type frequency variable filter in the high-frequency front end circuit in each of the embodiments will be described. FIG. 9 is a circuit diagram illustrating a first mode of the resonator filter-type frequency variable filter in the embodiment of the present disclosure. It should be noted that the following resonators are a piezoelectric resonator such as a SAW (surface acoustic wave) resonator, for example.

The frequency variable filter 61 includes a series arm resonance circuit 601, a first parallel arm resonance circuit 602, a second parallel arm resonance circuit 603, and connection terminals P601 and P602.

The series arm resonance circuit 601 is connected between the connection terminal P601 and the connection terminal P602. The first parallel arm resonance circuit 602 is connected between the series arm resonance circuit 601 at the connection terminal P601 side and the ground potential. The second parallel arm resonance circuit 603 is connected between the series arm resonance circuit 601 at the connection terminal P602 side and the ground potential.

The series arm resonance circuit 601 includes a capacitor 610, a resonator 611, an inductor 612, and a variable capacitor 613. The resonator 611, the inductor 612, and the variable capacitor 613 are connected in parallel. The capacitor 610 is connected in series to the parallel circuit. The resonance circuit is connected between the connection terminal P601 and the connection terminal P602. In this case, the capacitor 610 is connected to the connection terminal P601, that is, connected to the first parallel arm resonance circuit 602.

The first parallel arm resonance circuit 602 includes a resonator 621, an inductor 622, and a variable capacitor 623. The resonator 621, the inductor 622, and the variable capacitor 623 are connected in series. The series resonance circuit is connected between the connection terminal P601 and the ground potential.

The second parallel arm resonance circuit 603 includes a resonator 631, an inductor 632, and a variable capacitor 633. The resonator 631, the inductor 632, and the variable capacitor 633 are connected in series. The series resonance circuit is connected between the connection terminal P602 and the ground potential.

The series arm resonance circuit 601 and the first and second parallel arm resonance circuits 602 and 603 are band pass filters utilizing resonance points and anti-resonance points of the resonators 611, 621, and 631, respectively. The frequency variable filter 61 functions as a band pass filter having the pass band that is changed by changing the capacitances of the variable capacitors 613, 623, and 633.

An impedance of the resonator 621 is lower than an impedance of the resonator 631.

Figure 10:
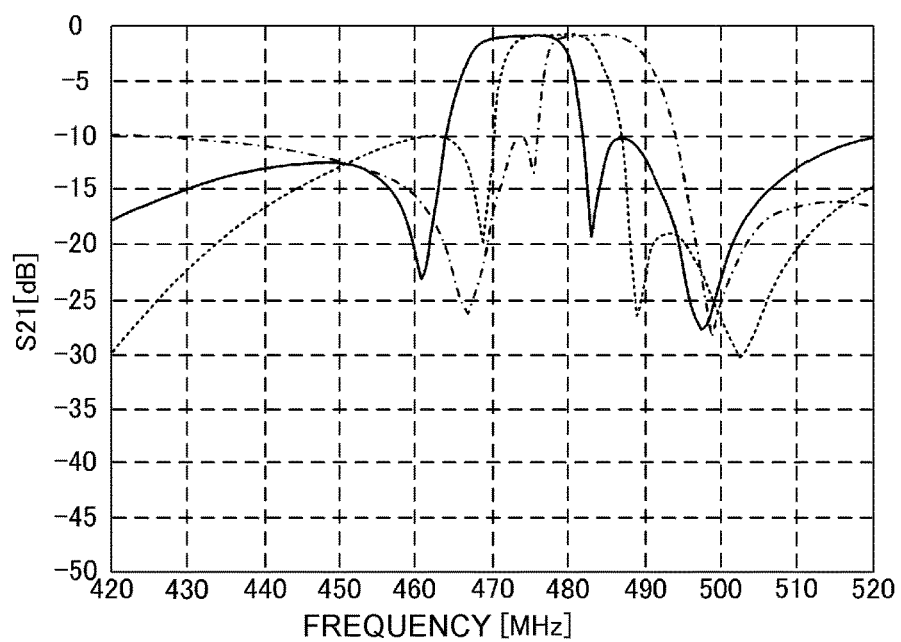
FIG. 10 is a graph illustrating bandpass characteristics of the frequency variable filter illustrated in FIG. 9.

FIG. 10 is a graph illustrating bandpass characteristics of the frequency variable filter illustrated in FIG. 9. As illustrated in FIG. 10, usage of the frequency variable filter 61 can achieve filter characteristics having the pass band width of approximately 10 [MHz] and having the attenuation poles at both sides of the pass band. In particular, the attenuation poles having steep attenuation characteristics and large attenuations can be formed at both sides of the pass band on the frequency axis by connecting the capacitor to the first series arm resonance circuit 601 at the first parallel arm resonance circuit 602 side, in other words, by connecting the capacitor to the side of the resonance filter including the resonator having a lower impedance, as illustrated in FIG. 9. Therefore, the high-frequency signals in the frequency bands of the channels adjacent to the selected channel can be largely attenuated.

Figure 11:
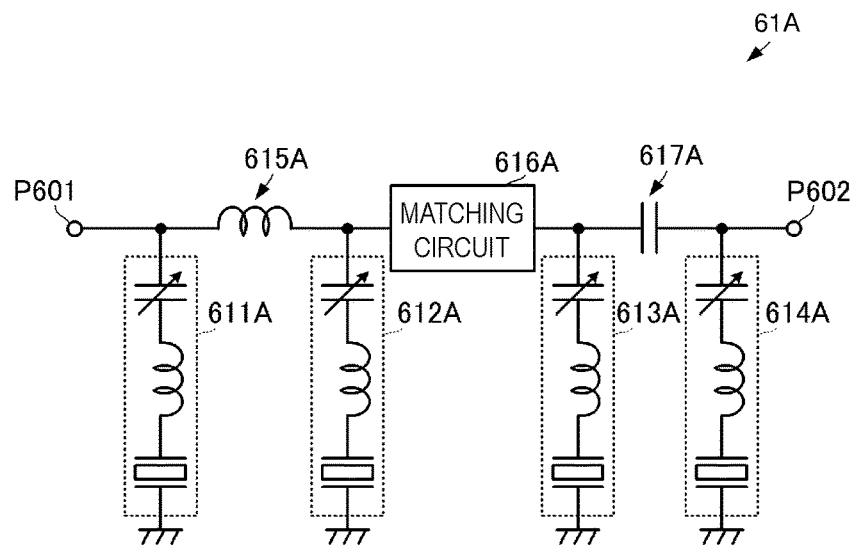
FIG. 11 is a circuit diagram illustrating a second mode of the resonator filter-type frequency variable filter in the embodiment of the present disclosure.

FIG. 11 is a circuit diagram illustrating a second mode of the resonator filter-type frequency variable filter in the embodiment of the present disclosure.

A frequency variable filter 61A includes resonance circuits 611A, 612A, 613A, and 614A, an inductor 615A, a matching circuit 616A, a capacitor 617A, and the connection terminals P601 and P602. Each of the resonance circuits 611A, 612A, 613A, and 614A is configured by a series resonance circuit of a resonator, an inductor, and a variable capacitor.

The inductor 615A, the matching circuit 616A, and the capacitor 617A are connected in this order from the connection terminal P601 side between the connection terminal P601 and the connection terminal P602.

The resonance circuit 611A is connected between a connection point of the connection terminal P601 and the inductor 615A and the ground potential. The resonance circuit 612A is connected between a connection point of the inductor 615A and the matching circuit 616A and the ground potential. The resonance circuit 613A is connected between a connection point of the matching circuit 616A and the capacitor 617A and the ground potential. The resonance circuit 614A is connected between a connection point of the capacitor 617A and the connection terminal P602 and the ground potential.

Even with this configuration, the high-frequency signals of the selected channel can be made to pass therethrough with low loss and the high-frequency signals of the adjacent channels can be attenuated.

Figure 12:
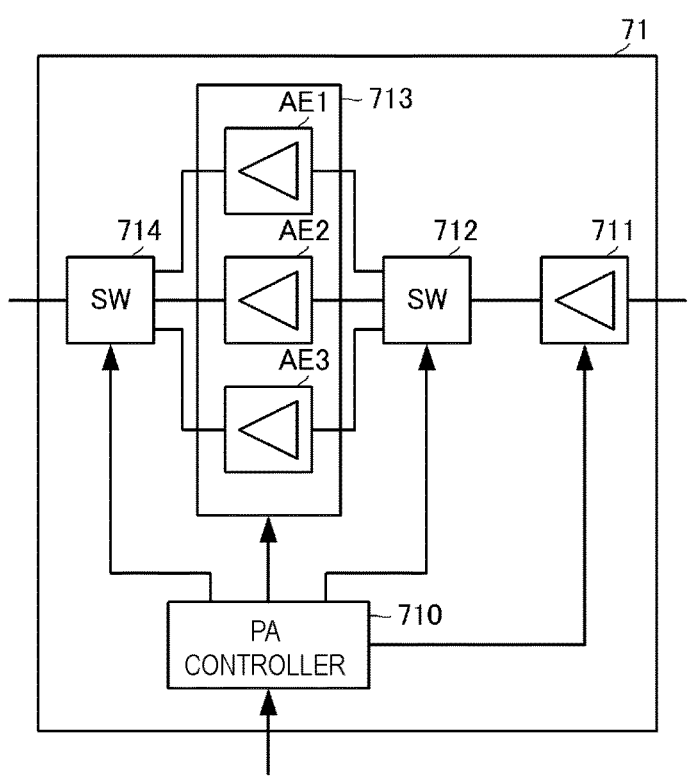
FIG. 12 is a circuit diagram illustrating a first mode of a transmission-side amplification circuit in the embodiment of the present disclosure.

Next, the specific configuration of the transmission-side amplification circuit in the high-frequency front end circuit in each of the embodiments will be described. FIG. 12 is a circuit diagram illustrating a first mode of the transmission-side amplification circuit in the embodiment of the present disclosure.

The transmission-side amplification circuit 71 includes a PA controller 710, a front-stage amplification element 711, switches 712 and 714, and a final-stage amplification element 713. The final-stage amplification element 713 includes frequency band-classified amplification elements AE1, AE2, and AE3.

The PA controller 710 performs switch control of the switches 712 and 714 based on the selected channel from the channel determination unit. Furthermore, the PA controller 710 controls amplification factors of the front-stage amplification element 711 and the final-stage amplification element 713 based on the selected channel.

The front-stage amplification element 711 amplifies the transmission signal generated by the transmission signal generator 801 (see FIG. 1) and outputs it to the switch 712.

The switch 712 selects any one of the frequency band-classified amplification elements AE1, AE2, and AE3 and connects it to an output terminal of the front-stage amplification element 711.

The frequency band-classified amplification elements AE1, AE2, and AE3 divide the communication band into three frequency bands and the frequency band-classified amplification elements AE1, AE2, and AE3 are assigned to the frequency bands, respectively. For example, the frequency band-classified amplification element AE1 is assigned to a low frequency band of the communication band, the frequency band-classified amplification element AE2 is assigned to a middle frequency band, and the frequency band-classified amplification element AE3 is assigned to a high frequency band.

The frequency band-classified amplification elements AE1, AE2, and AE3 amplify the transmission signal and output it to the switch 714.

The switch 714 selects any one of the frequency band-classified amplification elements AE1, AE2, and AE3 and connects it to the frequency variable filter 61 (see FIG. 1).

The division of the final-stage amplification element for the respective frequency bands as described above can suppress generation of distortion even when the amplification factors in the respective frequency bands are increased. Accordingly, the amplification factor as the transmission-side amplification circuit 71 can be improved. With this improvement, even when a plurality of filters are arranged at a posterior stage relative to the transmission-side amplification circuit 71 in the transmission path of the transmission signal, attenuations by these filters can be canceled, thereby reliably outputting the transmission signal having a desired signal intensity with each of the communication channels of the communication band.

Figure 13:
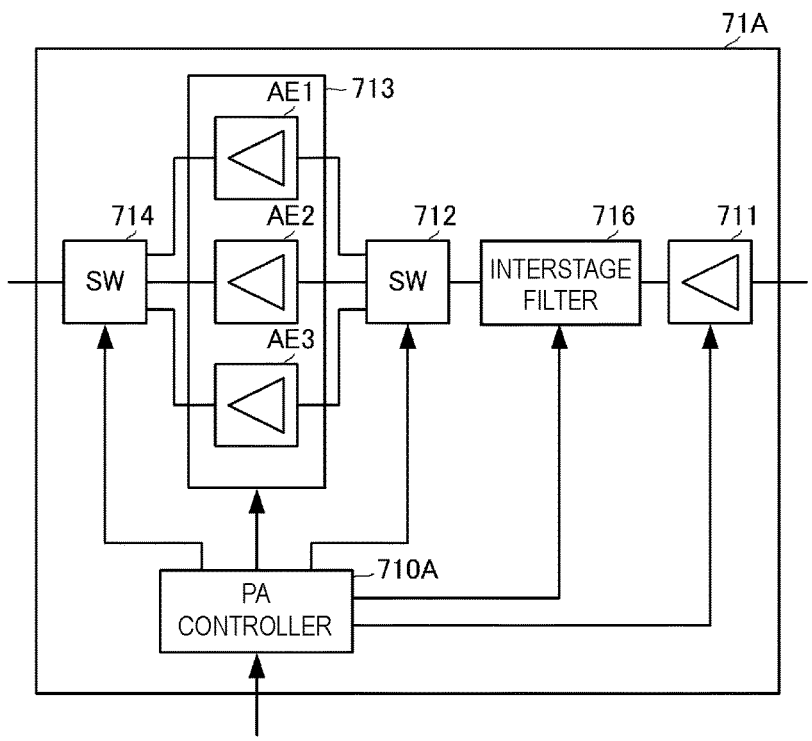
FIG. 13 is a circuit diagram illustrating a second mode of the transmission-side amplification circuit in the embodiment of the present disclosure.

FIG. 13 is a circuit diagram illustrating a second mode of the transmission-side amplification circuit in the embodiment of the present disclosure. A transmission-side amplification circuit 71A illustrated in FIG. 13 is configured by adding an interstage filter 716 to the transmission-side amplification circuit 71 illustrated in FIG. 12.

The interstage filter 716 is connected between the front-stage amplification element 711 and the switch 712. The interstage filter 716 attenuates at least a part of noise of a transmission system, which is propagated from the transmission signal generator 801 (see FIG. 1), and distortion of the front-stage amplification element 711.

Figure 14:
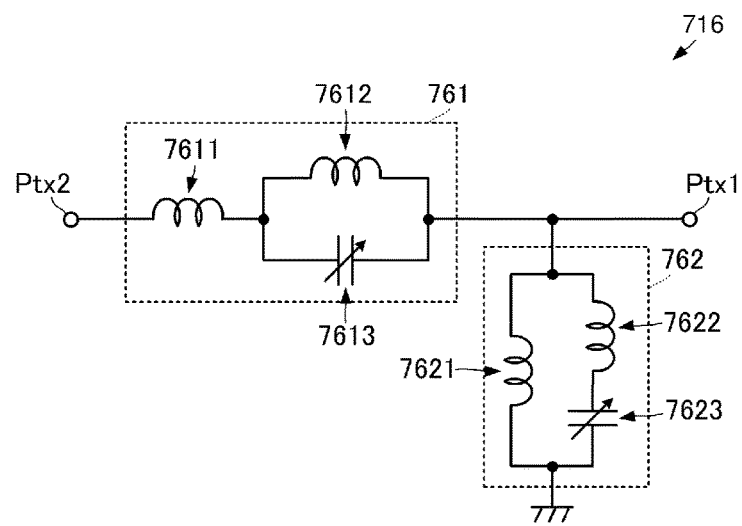
FIG. 14 is a circuit diagram illustrating an example of an interstage filter of the transmission-side amplification circuit in the embodiment of the present disclosure.

The interstage filter 716 has the circuit configuration illustrated in FIG. 14, for example. FIG. 14 is a circuit diagram illustrating an example of the interstage filter of the transmission-side amplification circuit in the embodiment of the present disclosure.

The interstage filter 716 includes resonance circuits 761 and 762 and connection terminals Ptx1 and Ptx2.

The resonance circuit 761 is connected between the connection terminal Ptx1 and the connection terminal Ptx2. The resonance circuit 762 is connected between the resonance circuit 761 at the connection terminal Ptx1 side and the ground potential.

The resonance circuit 761 includes inductors 7611 and 7612 and a variable capacitor 7613. The inductor 7612 and the variable capacitor 7613 are connected in parallel and this parallel circuit is connected in series to the inductor 7611. The inductor 7611 is connected to the connection terminal Ptx2 and the parallel circuit of the inductor 7612 and the variable capacitor 7613 is connected to the connection terminal Ptx1.

The resonance circuit 762 includes inductors 7621 and 7622 and a variable capacitor 7623. The inductor 7622 and the variable capacitor 7623 are connected in series and this series circuit is connected in parallel to the inductor 7621. One end of the parallel circuit is connected to the connection terminal Ptx1 and the other end thereof is connected to the ground potential.

The capacitances of the variable capacitors 7613 and 7623 are changed in accordance with control (control based on the selected channel) from the PA controller 710A (see FIG. 13). Therefore, the interstage filter 716 has filter characteristics in accordance with the frequency band-classified amplification elements AE1, AE2, and AE3. Accordingly, the filter characteristics appropriate for each of the communication channels of the communication band can be achieved and distortion of the front-stage amplification element 711 and noise of the transmission system in each of the communication channels can be appropriately suppressed.

Noise, distortion, and the like that are output from the transmission-side amplification circuit 71A can therefore be suppressed, thereby suppressing unnecessary waves contained in the transmission signal. Accordingly, the transmission characteristics as the high-frequency front end circuit can be improved.

Although the plurality of final-stage amplification elements are provided in the divided manner for the respective frequency bands in the above-described embodiment, one final-stage amplification element may amplify the transmission signals for all of the communication channels. In this case, no interstage switch may be provided. Furthermore, the interstage filter can also be omitted when a distortion harmonic signal level of the transmission signal is low.

Figure 15:
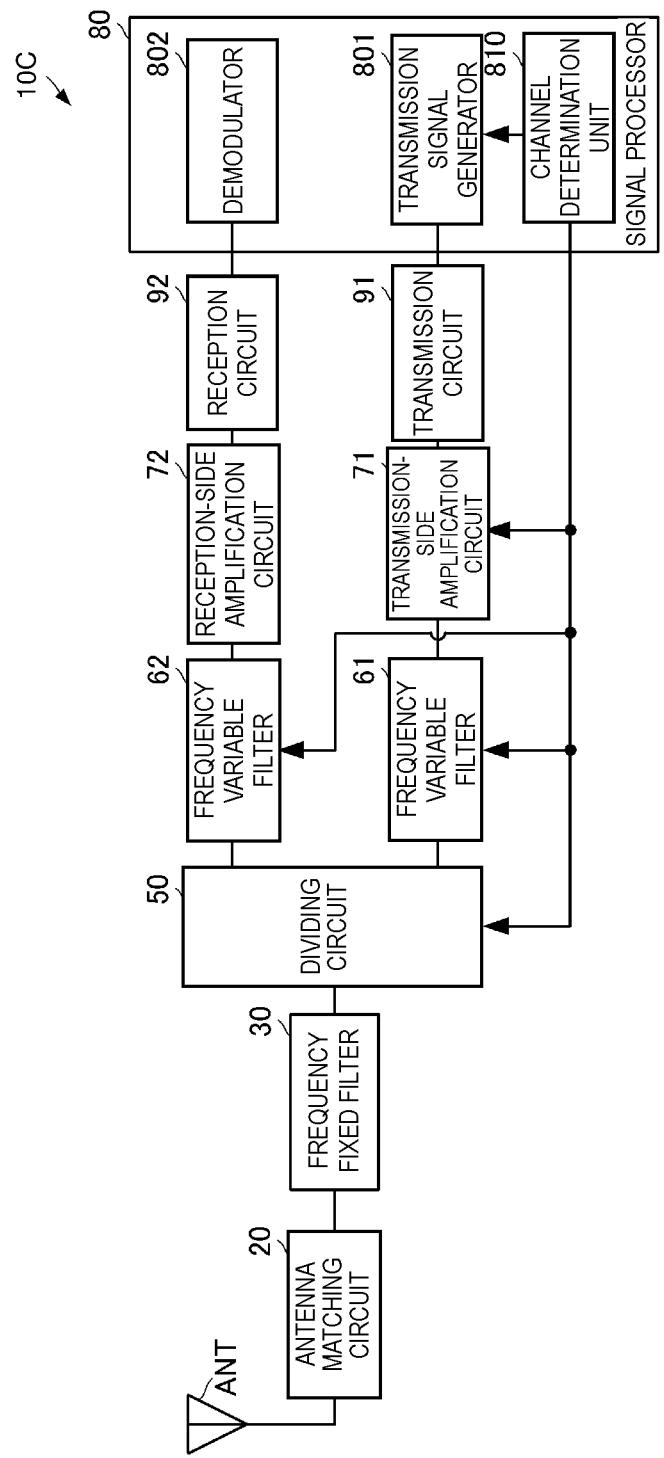
FIG. 15 is a functional block diagram of a high-frequency front end circuit according to a fourth embodiment of the present disclosure.

Furthermore, although three types of filters are provided at least in the transmission path of the communication signal of the transmission system in each of the above-described embodiments, two types of filters may be provided as in the following fourth embodiment. FIG. 15 is a functional block diagram of a high-frequency front end circuit in the fourth embodiment of the present disclosure.

A high-frequency front end circuit 10C in the embodiment is different from the high-frequency front end circuit 10 in the first embodiment in a point that the frequency variable LC filter 40 is omitted. Other configurations thereof are the same as those of the high-frequency front end circuit 10 in the first embodiment.

In this configuration, the frequency fixed filter 30 is connected to the diplexer 50. Even this configuration can also provide similar action effects as those in the first embodiment.

REFERENCE SIGNS LIST 10, 10A, 10B, 10C HIGH-FREQUENCY FRONT END CIRCUIT
20 ANTENNA MATCHING CIRCUIT
30 FREQUENCY FIXED FILTER
40, 40A, 40B FREQUENCY VARIABLE LC FILTER
61, 61A, 62 FREQUENCY VARIABLE FILTER
41 FIRST SERIES ARM LC FILTER CIRCUIT
42 FIRST PARALLEL ARM LC FILTER CIRCUIT
41A, 42A SERIES ARM LC FILTER CIRCUIT
43 SECOND PARALLEL ARM LC FILTER CIRCUIT
43A PARALLEL ARM LC FILTER CIRCUIT
601 SERIES ARM RESONANCE CIRCUIT
602 FIRST PARALLEL ARM RESONANCE CIRCUIT
603 SECOND PARALLEL ARM RESONANCE CIRCUIT
611A, 612A, 613A, 614A, 761, 762 RESONANCE CIRCUIT
50 DIPLEXER
71, 71A TRANSMISSION-SIDE AMPLIFICATION CIRCUIT
72 RECEPTION-SIDE AMPLIFICATION CIRCUIT
80 SIGNAL PROCESSOR
90 DETECTOR
91 TRANSMISSION CIRCUIT
92 RECEPTION CIRCUIT
411, 413, 610, 617A CAPACITOR
411A, 412, 414, 421, 421A, 431, 431A, 432A, 441A, 442A, 612, 615A, 622, 632, 7611, 7612, 7621, 7622 INDUCTOR
415, 422, 432, 412A, 422A, 433A, 613, 623, 633, 7613, 7623 VARIABLE CAPACITOR
611, 621, 631 RESONATOR
616A MATCHING CIRCUIT
710, 710A PA CONTROLLER
711 FRONT-STAGE AMPLIFICATION ELEMENT
712, 714 SWITCH
713 FINAL-STAGE AMPLIFICATION ELEMENT
716 INTERSTAGE FILTER
801 TRANSMISSION SIGNAL GENERATOR
802 DEMODULATOR
810 CHANNEL DETERMINATION UNIT
AE1, AE2, AE3 FREQUENCY BAND-CLASSIFIED POWER AMPLIFIER
ANT ANTENNA
P401, P402, P601, P602, Ptx1, Ptx2 CONNECTION TERMINAL

The invention claimed is:

1. A high-frequency front end circuit for wireless communication in a usage channel selected from vacant channels, the usage channel and the vacant channels being among a plurality of communication channels in a frequency band used in a wireless communication system, the circuit comprising:
    a fixed filter configured to attenuate a high-frequency signal outside the frequency band; and
    a variable filter configured to attenuate a high-frequency signal in the frequency band but of a communication channel other than the usage channel, the communication channel other than the usage channel varying in accordance with selection of the usage channel,
    wherein the fixed filter is a frequency fixed-type LC filter and the variable filter is a frequency variable-type elastic wave resonator filter.

2. The high-frequency front end circuit according to claim 1, wherein:
    the system utilizes a television (TV) white space,
    the frequency band is used in television broadcasting, and
    the vacant channels are channels that are used in television broadcasting.

3. The high-frequency front end circuit according to claim 1, wherein the variable filter is configured to transmit a high-frequency signal of the usage channel and to attenuate high-requency signals of communication channels that are within three communication channels of the usage channel.

4. The high-frequency front end circuit according to claim 1, comprising:
    a transmission-side circuit configured to pass a transmission signal using the usage channel;
    a reception-side circuit configured to pass a reception signal using the usage channel;
    an antenna-side circuit configured to pass the transmission signal and the reception signal; and
    a diplexer connecting the transmission-side circuit and the reception-side circuit with the antenna-side circuit,
    wherein the fixed filter is included in the antenna-side circuit, and
    the variable filter is included in the transmission-side circuit.

5. The high-frequency front end circuit according to claim 4, wherein the variable filter is also included in the reception-side circuit.

6. The high-frequency front end circuit according to claim 1, further comprising a second variable filter configured to attenuate intermodulation distortion in the frequency band, wherein the second variable filter is a frequency variable-type LC filter.

7. The high-frequency front end circuit according to claim 6, wherein the second variable filter is between the fixed filter and the diplexer or between the diplexer and the variable filter.

8. The high-frequency front end circuit according to claim 4, wherein:
    a communication signal that is transmitted and received with an antenna connected to the antenna-side circuit comprises variable filter information related to the high-frequency signal in the frequency band but of the communication channel other than the usage channel, and
    the variable filter is configured to attenuate the high-frequency signal of the communication channel other than the usage channel based on the variable filter information.

9. The high-frequency front end circuit according to claim 4, further comprising:
    a detector circuit configured to detect reception levels of the vacant channels; and
    a determination unit configured to select, as the usage channel, a vacant channel having the highest reception level among the detected reception levels.

10. The high-frequency front end circuit according to claim 4,
    wherein the transmission-side circuit comprises an amplification circuit configured to amplify the transmission signal, the amplification circuit comprising:
    a first amplification element configured to amplify the transmission signal; and
    a second amplification element configured to amplify a signal output from the first amplification element.

11. The high-frequency front end circuit according to claim 10, wherein the amplification circuit further comprises an interstage filter connected between the first amplification element and the second amplification element, the interstage filter being configured to attenuate a harmonic distortion signal of the transmission signal.

12. The high-frequency front end circuit according to claim 10, wherein the amplification circuit further comprises:
    a plurality of second amplification elements, the plurality of second amplification elements being configured to amplify signals of different frequency bands, and
    an interstage switch configured to selectively connect at least one of the plurality of second amplification elements to the first amplification element in accordance with the usage channel.

13. The high-frequency front end circuit according to claim 1, wherein the variable filter comprises:
    an input terminal;
    an output terminal;
    a series arm resonance circuit connected between the input terminal and the output terminal, a first end of the series arm resonance circuit being connected to the input terminal and a second end of the series arm resonance circuit being connected to the output terminal;
    a first parallel arm resonance circuit connected between the first end of the series arm resonance circuit and ground; and
    a second parallel arm resonance circuit connected between the second end of the series arm resonance circuit and ground, wherein:
    the series arm resonance circuit comprises a fixed capacitor having a fixed capacitance, and a variable capacitor, an inductor, and an elastic wave resonator connected in parallel with each other and in series with the fixed capacitor,
    each of the first parallel arm resonance circuit and the second parallel arm resonance circuit comprises a variable capacitor, an inductor, and an elastic wave resonator connected in series with each other, and
    the fixed capacitor is connected to the end of the series arm resonance circuit to which the parallel arm resonance circuit having the elastic wave resonator with the lowest impedance is connected.

14. The high-frequency front end circuit according to claim 1, wherein the variable filter comprises:
    an input terminal;
    an output terminal;
    a series inductor, a matching circuit, and a series capacitor connected in series with each other, the series inductor being connected to the input terminal and the series capacitor being connected to the output terminal;

four parallel arm resonance circuits each comprising a variable capacitor, an inductor, and an elastic wave resonator connected in series with each other, wherein a first of the four parallel arm resonance circuits is connected at a first end to a node between the input terminal and the series inductor, and at a second end to ground, a second of the four parallel arm resonance circuits is connected at a first end to a node between the series inductor and the matching circuit, and at a second end to ground, a third of the four parallel arm resonance circuits is connected at a first end to a node between the matching circuit and the series capacitor, and at a second end to ground, and a fourth of the four parallel arm resonance circuits is connected at a first end to a node between the series capacitor and the output terminal, and at a second end to ground.

15. The high-frequency front end circuit according to claim 6, wherein the second variable filter includes:

an input terminal;

an output terminal;

a first series arm LC filter circuit connected between the input terminal and the output terminal, a first end of the first series arm LC filter circuit being connected to the input terminal and a second end of the first series arm LC filter circuit being connected to the output terminal;

a first parallel arm LC filter circuit connected between the first end of the first series arm LC filter circuit and ground; and a second parallel arm LC filter circuit connected between the second end of the series arm LC filter circuit and ground, wherein each of the first parallel arm LC filter circuit and the second parallel arm LC filter circuit comprises a variable capacitor and an inductor connected in series, and wherein the first series arm LC filter circuit comprises a fixed capacitor, an LC series circuit, and an LC parallel circuit, wherein:

the fixed capacitor is connected in parallel with the LC series circuit, the LC series circuit comprises a fixed capacitor and an inductor connected in series, the fixed capacitor being connected to the input terminal and the inductor being directly connected to the output terminal or connected to the output terminal with another inductor interposed between the inductor and the output terminal, and the LC parallel circuit comprises a variable capacitor and an inductor connected in parallel and is connected at one end to a node between the inductor and the fixed capacitor of the LC series circuit, and at another end to ground.

16. The high-frequency front end circuit according to claim 6, wherein the second variable filter includes:

an input terminal;

an output terminal;

a first series arm LC circuit comprising an inductor and variable capacitor connected in parallel with each other;

a first series inductor connected between the input terminal and the first series arm LC circuit;

a second series arm LC circuit comprising an inductor and variable capacitor connected in parallel with each other;

a second series inductor connected between the output terminal and the second series arm LC circuit; and a parallel arm LC circuit comprising a first inductor and a variable capacitor connected in series with each other, and a second inductor connected in parallel with the first inductor and the variable capacitor, wherein the parallel arm LC circuit is connected at a first end to a node between the first series arm LC circuit and the second series arm LC circuit, and at a second end to ground.

17. A communication apparatus comprising the high-frequency front end circuit according to claim 1, wherein the communication apparatus executes audio communication or data communication using a communication signal that is transferred in wireless communication with the high-frequency front end circuit.

* * * * *